(12) United States Patent
Braun et al.

(10) Patent No.: US 12,320,072 B2
(45) Date of Patent: Jun. 3, 2025

(54) STAINABLE DECORATIVE BOARD

(71) Applicant: SWISS KRONO Tec AG, Lucerne (CH)

(72) Inventors: Roger Braun, Willisau (CH); Pius Steinmann, Schötz (CH)

(73) Assignee: SWISS KRONO Tec AG, Lucerne (CH)

( * ) Notice: Subject to any disclaimer, the term of this patent is extended or adjusted under 35 U.S.C. 154(b) by 0 days.

(21) Appl. No.: 17/043,008

(22) PCT Filed: Mar. 29, 2019

(86) PCT No.: PCT/EP2019/058049
§ 371 (c)(1),
(2) Date: Sep. 29, 2020

(87) PCT Pub. No.: WO2019/185887
PCT Pub. Date: Oct. 3, 2019

(65) Prior Publication Data
US 2021/0010203 A1    Jan. 14, 2021

(30) Foreign Application Priority Data

Mar. 29, 2018 (EP) ..................................... 18165078
Mar. 29, 2018 (EP) ..................................... 18165082
Nov. 23, 2018 (DE) ...................... 10 2018 129 628.2

(51) Int. Cl.
*D21H 19/84* (2006.01)
*B32B 37/12* (2006.01)
(Continued)

(52) U.S. Cl.
CPC ............. *D21H 19/84* (2013.01); *B32B 37/12* (2013.01); *B32B 38/08* (2013.01); *B32B 38/164* (2013.01);
(Continued)

(58) Field of Classification Search
CPC ...... D21H 19/84; D21H 19/822; D21H 27/26; D21H 19/82; B32B 37/12; B32B 38/08;
(Continued)

(56) References Cited

U.S. PATENT DOCUMENTS 4,386,180 A    5/1983 Lat et al.
4,409,276 A    10/1983 Martinelli et al.
(Continued)

FOREIGN PATENT DOCUMENTS

DE    102004043355 A1 *  3/2006
EP    3040476 A1    7/2016
(Continued)

OTHER PUBLICATIONS

Machine translation of EP 3,040,476 via EPO (Year: 2016).*
(Continued)

*Primary Examiner* — Cynthia L Schaller
(74) *Attorney, Agent, or Firm* — Bachman & LaPointe, P.C.

(57) ABSTRACT

A method for producing a color-changeable synthetic resin surface or lacquered surface includes providing a backing layer with a bottom side and a top side, fully impregnating the backing layer with a liquid impregnant without a stain additive and at least drying the impregnated backing layer. In order to provide a decorative surface with coloring which can be modified by the end consumer in a simple, inexpensive and resistant manner, a layer of coating agent is applied to the top side of the backing layer and is dried, and the backing layer is then bonded to a material, wherein the one layer is cured in order to form an open-pore layer which is at least as transparent as possible upon drying and/or bonding on the top side.

9 Claims, 2 Drawing Sheets

(51) Int. Cl.
- *B32B 37/24* (2006.01)
- *B32B 38/00* (2006.01)
- *B32B 38/08* (2006.01)
- *B44C 1/10* (2006.01)
- *B44C 5/04* (2006.01)
- *C09D 4/00* (2006.01)
- *D21H 19/82* (2006.01)
- *D21H 27/26* (2006.01)

(52) U.S. Cl.
CPC ............... *B44C 1/10* (2013.01); *B44C 1/105* (2013.01); *B44C 5/04* (2013.01); *B44C 5/043* (2013.01); *C09D 4/00* (2013.01); *D21H 19/822* (2013.01); *D21H 27/26* (2013.01); *B32B 2037/1215* (2013.01); *B32B 2037/243* (2013.01); *B32B 2305/026* (2013.01); *B44C 5/0461* (2013.01); *B44C 5/0469* (2013.01); *B44C 5/0476* (2013.01)

(58) Field of Classification Search
CPC .......... B32B 38/164; B32B 2037/1215; B32B 2037/24332; B32B 2260/028; B32B 2307/412; B32B 7/12; B32B 2307/546; B32B 2471/00; B32B 21/02; B32B 2255/10; B32B 2255/12; B32B 2307/75; B32B 13/08; B32B 13/12; B32B 21/06; B32B 29/005; B32B 2255/26; B32B 2260/046; B32B 2307/402; B32B 2307/718; B32B 2419/00; B32B 2451/00; B32B 2607/02; B32B 21/08; B44C 1/10; B44C 1/105; B44C 5/043; B44C 5/0461; B44C 5/0469; B44C 5/0476; B44C 5/04; C09D 4/00; C09D 5/002; C09D 7/61; C09D 15/00; C09D 133/06; C09D 175/04
See application file for complete search history.

(56) References Cited

U.S. PATENT DOCUMENTS

| | | |
|---|---|---|
| 5,601,876 A | 2/1997 | Oates et al. |
| 5,989,681 A | 11/1999 | Martino |
| 7,273,651 B1 | 9/2007 | Wilde |
| 2013/0273336 A1 | 10/2013 | Kuehnberger et al. |
| 2018/0043655 A1* | 2/2018 | Fuhr .................. B32B 5/18 |

FOREIGN PATENT DOCUMENTS

| | | |
|---|---|---|
| GB | 2116192 A | 9/1983 |
| JP | H06143212 A * | 5/1994 |
| WO | 03078761 A1 | 9/2003 |

OTHER PUBLICATIONS

Machine Translation of the Description of Kronotec AG, EP3040476(A1) (published Jul. 6, 2016)(EPO/Google) (Year: 2022).*
DE102004043355A1 Machine Translation of Description (Year: 2024).*
JPH06143212A Machine Translation of Description (Year: 2024).*
International preliminary report on patentability for application No. PCT/EP2019/058049 dated Sep. 29, 2020.

* cited by examiner

STAINABLE DECORATIVE BOARD

BACKGROUND OF THE INVENTION

The invention relates to a method for producing a color-changeable synthetic resin surface or lacquer surface, a material, a decorative paper, and a finish film.

Decorative surfaces made of synthetic resin or lacquer are generally known and are for example used for floor coverings, wall coverings, ceiling coverings or furniture surfaces. These have a decorative layer that comprises a paper with a printed decoration, or a decoration painted onto a substrate. Normally, a protective layer is arranged on the decorative layer that is either configured as an overlay saturated with synthetic resin or as a lacquer layer. It is moreover known to provide the surface with a structural decoration that for example can be stamped or painted on. The layers arranged above the decoration are at least semitransparent so that the viewer can perceive the decoration.

A disadvantage is that the colored design of such surfaces can scarcely be influenced afterwards. In particular, an individual colored surface design by the end consumer as for example achieved with solid wood by staining the surfaces is no longer possible with such synthetic resin and lacquer surfaces.

Particularly in the North American region, there is however an increased need for decorative surfaces that can be colored afterward by the end consumer himself, wherein the actual decorative structures remain visible, and only the hue is to be adapted. Such surfaces that can be changed in color afterward by the end consumer could only be provided to date using solid wood surfaces such as for example with solid timber or wood veneers.

SUMMARY OF THE INVENTION

The object of the invention is therefore to provide a decorative surface that can be changed very easily in terms of its color by the end consumer, and that is particularly economical and durable.

The invention achieves the object with a method, a material, a decorative paper, and a finish film all having the features disclosed herein. Advantageous further embodiments of the invention are set forth in the dependent claims. All of the described features constitute the subject matter of the invention both per se and in any combination, independent of their summary in the claims or their references.

The method according to the invention for producing a color-changeable synthetic resin surface or lacquer surface has the following steps: Provide a backing layer having a bottom side and top side, fully impregnate the backing layer with a liquid impregnant without a stain additive, at least slightly dry the impregnated backing layer, apply a layer of a coating agent to the top side of the backing layer, dry the least one coating agent layer, bond the backing layer to a material, wherein the one layer cures to an open-pore, at least largely transparent layer upon drying and/or bonding on the top side.

With conventional cured synthetic resin surfaces or lacquer surfaces, it is no longer possible for color pigments to penetrate into the layer. Nonetheless, color pigments can be applied to the surface. The synthetic resin surface or lacquer surface with the open-pore cured surface produced according to the invention now allows a particularly easy subsequent adaptation of color (hereinafter also termed staining) of the synthetic resin surface or lacquer surface as is otherwise only known when staining solid wood surfaces. The colorings (color pigments) that can be subsequently applied penetrate into the cured outer layer and color it. The change in color according to the invention is not understood to be subsequently colored painting, varnishing, or the like.

Preferably, the backing layer has a decorative print that is printed onto the top side of the backing layer. Accordingly, the decoration can for example display structures of a decoration. In particular, the decoration represents for example wood grains, rock grains, rock decorations, tile decorations or fantasy decorations as well. The decoration can be configured as a colored decoration, a decoration in gray tones, or also a black/white decoration. The decoration is still visible by the viewer both through the impregnant as well as through the one layer so that both the impregnant as well as the one layer is configured to be at least semitransparent, preferably completely transparent. Even after staining, i.e., after the change in color, the decoration printed onto the backing layer is retained and visible; however, the overall hue of the synthetic resin surface, or respectively lacquer surface, changes.

With the surface according to the invention, it is for example possible to darken a bright overall appearance of the synthetic resin/lacquer surface that is produced by an intrinsically bright printed decoration, for example by means of a dark stain; i.e., the applied coloring (color pigments) produces a dark coloration of the synthetic resin/lacquer surface, wherein the at least largely transparent layer also remains largely transparent, and the printed decorative structure is still visible.

"Color-changeable" is understood to mean that the overall colored appearance of the synthetic resin surface/lacquer surface provided by the decorative print on the backing layer is individually changed subsequently by an additional application of color in the cured coating agent layer. The subsequent change can for example be performed industrially, corresponding to an industrially performed staining of wood veneer or solid wood. The inventive color-changeable decorative surface also offers the option of performing the change in color at a later time, i.e., in a post-industrial production area, for example by an installer or the consumer. Since the layer of the coating agent is generally applied on the entire surface, the option also exists of performing the adaptation in color either on the entire surface, or only on parts of the surface. Highly individual color designs of his synthetic resin surfaces/lacquer surfaces can be carried out especially by the end consumer.

As already mentioned, the decorative structures produced by the printed decoration preferably remain still visible in the change in color; only the basic hue of the synthetic resin surface/lacquer surface is again changed by changing the color. This enables an extreme degree of individualization by the particular end consumer. Existing structural decorations (3D surfaces), i.e., structured surfaces, are also retained since the layer consisting of coating agent duplicates the 3D structure, and the color pigments penetrate into the surface. With 3D surfaces, their visual effect is also enhanced by the stain. Given the three-dimensional structure, more stain collects in the region of recesses that for example represent wood pores or grain than in the region of an elevation. These regions therefore also take the color of color pigments more than regions in which less color pigments are applied. Contrastingly, unstructured surfaces are evenly colored by the stain.

The adaptation in color of the synthetic resin surfaces/lacquer surfaces can be carried out with the same stains, for example a water-based stain, an oil-based stain or a solvent stain, as well as with the same devices as with a normal wood surface stain.

The color-changeable synthetic resin surface/lacquer surface is structured in multiple layers and has at least one backing layer impregnated with an impregnant, and a layer of a coating agent on the surface of the backing layer. The synthetic resin surface/lacquer surface is completely cured before a change in color is performed and, as already mentioned, can have a corresponding surface structure (3D structure), for example a negative copy of the press plate, or as a paint pore; i.e., for example a synthetic resin surface is changed to a final state by means of heat and pressure in which the synthetic resin is for example present as a curable plastic.

The backing layer is in particular a cellulose-based backing layer that is provided in the form of a web or for example also in the form of a sheet. In particular, the backing layer is a paper web/a paper sheet, for example a decorative paper/decorative sheet. The backing layer accordingly has a flat bottom side, and a flat top side opposite the bottom side. The top side corresponds to the side visible by a viewer in its subsequent use (visible side). The decoration can be printed on the top side. The decorative print can be produced by conventional printing methods. The decorative print is in particular configured as a wood decoration, i.e., showing a wood surface.

The backing layer is subject to full impregnation. This is understood to mean that the backing layer is fully impregnated once, i.e., both the bottom side as well as the top side as well as within its material core (region between the outer surfaces) are impregnated with a synthetic resin or lacquer.

In full impregnation, in particular cavities in the backing layer are to be filled. Accordingly for example, in particular gaps between the individual fibers of the backing layer are to be filled when the backing layer is formed from cellulose, paper, etc. Full impregnation can be performed with conventional impregnation devices, wherein in particular an impregnation bath is advantageous.

Independent of whether a synthetic resin surface or a lacquer surface is produced, the backing layer is surface-dried at least slightly (gelled) after impregnation and, if applicable dried as well, but not completely cured (i.e., it is processed further in a not ready-to-use state) which significantly facilitates subsequent top side coating, and a particularly effective and insoluble bond between the resinated backing layer and the coating agent layer can be produced. It is therefore for example possible to predry one side as an intermediate step in two-sided impregnation, for example using heat before also applying an impregnant on the opposite side for full impregnation. Drying can for example be carried out using hot air in a drying channel in a suspension process between 60° C. and 200° C., in particular between 40° C. and 60° C.

Additional or alternative drying processes are for example performed after applying the top-side coating agent layer. Drying can also occur for example after the application, which may be performed, of a bottom-side coating with an adhesive resin/adhesive.

Depending on the employed material of the backing layer, the impregnant, the amount of impregnant, and/or the degree of drying after full impregnation, the fully saturated backing layer can be configured as a largely rigid backing layer, or respectively further processed into a board-shaped backing layer, or also configured as a flexible backing layer, for example a finish film that can be rolled up.

Accordingly, a flat backing layer for example largely rigid from corresponding drying can be easily placed on a board-shaped material and transferred to a press. When the backing layer is formed as a flexible layer, it can for example be laminated onto the material. In this respect, it is for example also possible to coat the material with the backing layer on multiple sides.

It is alternatively also possible to dry the backing layer coated on one or both sides and for example to store it for subsequent pressing with the material, or for example to sell it as well. Such an intermediate product will also be termed a decorative paper, or respectively finish film in the following.

In the context of the invention, a "synthetic resin surface" is understood to be systems consisting of impregnant and coating agent in which the complete curing of the impregnant and the coating agent is carried out under the effect of heat and pressure, for example in a short cycle press or a continuous press. In this case, the exerted pressure lies above the atmospheric pressure.

Contrastingly in the context of the invention, a "lacquer surface" is understood to be a system consisting of impregnant and coating agent in which the complete curing of the impregnant and the coating agent occurs without pressure, i.e., under at most atmospheric pressure and without a pressing device, and exclusively under the effect of heat, UV radiation, electron radiation and/or high-frequency.

The coating agent is configured such that it cures as a porous surface (open pore), which enables the subsequent change in color. "Porous/open pore" is understood to mean that the cured coating is configured to absorb colorings (color pigments) within the layer. The pores are preferably indiscernible to a naked eye. The cured coating can be completely transparent so that a decoration printed on the backing layer is perceptible undistorted. It is possible for the cured coating to already place a first basic hue over the decoration that is again modified later by the color application and the absorption of the colorings in the coating.

The backing layer is bonded to a material independent of the configuration of the backing layer, and the employed impregnants and coating agents either with an adhesive resin, such as for example a melamine resin that is also cured under pressure and heat, or with an adhesive that for example cures like a lacquer.

In particular an open-pore curing multicoat lacquer based on acrylate resins can be used as the coating agent layer such as for example the HYDRO-UV multicoat lacquer HUE 8656X by the company Hesse-Lignal.

According to a further embodiment of the invention it is provided that a mixture comprising a synthetic resin with a stain additive, or a mixture comprising a lacquer and a stain additive are applied as the coating agent.

It should be noted that independent of whether a material, a finish film or a decorative paper is to be produced, a backing layer is coated that is impregnated with an synthetic resin, preferably also with a coating agent layer comprising a stain additive based on an synthetic resin and a backing layer impregnated with a lacquer, preferably also with a lacquer-based coating agent layer comprising a stain additive, wherein a backing layer fully impregnated with synthetic resin can be coated with a lacquer-based coating agent layer and vice versa.

A stain additive is understood to be an additive present in the coating agent and supports and/or causes the formation of a porous surface (open-pore) of the coating agent layer applied and dried, or respectively cured as a layer.

According to a further embodiment of the invention, kaolin, alumina, silica, chalk, mica, quartz sand, silicate, cellulose, natural fibers, glass spheres or glass powder is used as the stain additive. Kaolin can for example be used as hydrated aluminum silicate. Preferably, the stain additives can be silanized, in particular mica, glass spheres and/or glass powder. Particularly preferably, kaolin is used in a hydrogenated and/or calcined form, wherein a mixture, for example at a ratio of 50% by weight:50% by weight of the two forms is advantageous. Accordingly, the calcined form allows the stain colors to fix particularly well, whereas the hydrated form is more transparent and thus prevents reduced coverage of the decoration. The preferred stain additives can be used both with a coating agent formed as a lacquer as well as a coating agent configured as a synthetic resin.

Moreover, silanized kaolin is preferably used since this additionally promotes the adhesion of the stain color. This can be used as a mixture with non-silanized kaolin. Particularly preferably, the portion of silanized kaolin is between 50% by weight to 80% by weight of the overall kaolin requirement.

Kaolin and chalk also produce a suction effect with colorings applied as a liquid stain by means of which the colorings are incorporated particularly easily in the coating. Moreover, kaolin and chalk fix the colorings in the coating particularly well.

To further improve the incorporation of the coloring in the coating and therefore also make it very easy to color the surface, the percent weight of the stain additive in the coating agent before the coating is applied is 10% by weight to 60% by weight, preferably 10% by weight to 50% by weight, particularly preferably 20% by weight to 50% by weight, preferably 30% by weight to 50% by weight according to a further embodiment of the invention. The preferred weight ratios of the coating yet to be applied ensure a particularly effective and even open-pore formation of the surface so that the inclusion of the color pigments in the synthetic resin surface/lacquer surface, or respectively their fixation in the respective surface can be very even and effective.

According to a further embodiment of the invention, a synthetic resin, or a lacquer based on an aminoplast, in particular a urea resin such as urea-formaldehyde (UF) or melamine-urea-formaldehyde (MUF), of acrylate, polyurethane (PU), phenol resin, polyester, alkyd, nitrocellulose or latex or a mixture of at least two of the aforementioned substances is used as the coating agent. Particularly preferably, lacquers based on acrylate resins that can also be used as a primer are useful that possibly can be correspondingly cured porous also without a stain additive.

Particularly preferably, a synthetic resin/kaolin mixture is used as the coating agent with a stain additive for producing a synthetic resin surface, in particular a urea resin/kaolin mixture such as for example a mixture consisting of a UF resin and kaolin, or MUF resin and kaolin, since in these combinations, a particularly even distribution is enabled of the stain additive in the coating agent, as well as a particularly good bond of the stain to be subsequently applied in the layer of coating agent.

In the production of lacquer surfaces, a lacquer based on acrylate and/or polyurethane_(PUR) with a stain additive based on kaolin is particularly advantageous as the coating agent since, as noted above with regard to the synthetic resin surface, a particularly even distribution of the stain additive in the coating agent and a particularly good bond of the stain to be subsequently applied in the layer of coating agent is enabled with these combinations as well.

According to a further embodiment of the invention, a synthetic resin or lacquer based on an aminoplast, in particular a urea resin such as UF resin or based on acrylate, PUR, phenol resin, of a melamine formaldehyde resin or a mixture or a combination of the aforementioned resins is used as the impregnant. Independent of the basis of the impregnant, it does not include any stain additive. In the production of synthetic resin surfaces, in particular urea resin is used, whereas in the production of lacquer surfaces, in particular urea formaldehyde resin, melamine formaldehyde resin, a combination of urea formaldehyde resin and melamine formaldehyde resin and/or acrylate or PUR are used.

It is advantageous in principle if the individual resin or lacquer systems for full impregnation and for the coating applied to the top side to be harmonized with each other in order for example to achieve particularly effective adhesion with each other and prevent delamination effects.

The layer of a coating agent can be applied liquid. To do this, a development of the invention provides that the coating agent is applied to the top side of the backing layer using a roller device, a squeegee or a spray device. In particular, the coating agent is applied exclusively to the top side. Accordingly, for example no impregnation bath is used either for the coating agent application.

Alternatively and particularly in systems consisting of synthetic resin, a coating agent layer can for example also be used as an impregnant for an overlay instead of a liquid application of the coating agent layer, so that the coating agent layer is formed by an overlay that is impregnated with a coating agent with or without a stain additive. The overlay was pressed to the backing layer for example under the effect of heat and pressure and cured. In this embodiment, the overlay fulfills two functions. On the one hand, it still serves as a protective layer, on the other hand, it produces the ability of the surface to be stained.

Contrastingly with a lacquer surface, it is for example possible to still apply liquid the coating agent layer responsible for stainability with or without a stain additive and to also configure it as a protective layer of corresponding conventional protective layers of lacquer surfaces; i.e., the coating agent layer can moreover include additives such as corundum, etc. that cause a strengthening of the coating agent layer against external influences. A double effect can therefore be achieved in this case as well with the coating agent layer (protection and stainability).

For final use, the color-adaptable backing layers are arranged on another material (a material substrate). This is done in turn depending on the embodiment as a lacquer surface or as a synthetic resin surface. The application on the material can be done either directly afterwards or also at a delay so that the color-adaptable backing layers exist as decorative paper or finish films.

Particularly when using urea resins as the impregnant, a direct bond between the impregnated backing layer and the material is difficult since urea resins do not enable an effective adhesive bond. Hence according to a further embodiment of the invention, a layer of adhesive resin is applied to the bottom side of the backing layer which adheres the backing layer to the material under the effect of pressure and heat.

In particular a synthetic resin layer based on melamine or phenol is arranged as the adhesive resin. As with the coating agent, the application preferably occurs with a roller arrangement, a squeegee or a spray device. In this case, melamine is particularly advantageous since it can be cured to form a transparent layer so that a change in color, for example a dark background, cannot arise from the bottom side.

The arrangement can be such that either at least one layer of adhesive resin is applied to the top side of the material, or at least one layer of adhesive resin is applied to the bottom side of the backing layer. Alternatively, at least one layer of adhesive resin can be applied both to the top side of the material as well as to the bottom side of the backing layer.

Depending on the adhesive resin, it is either laid on (in a solid state) or applied (in a liquid state).

It is accordingly conceivable for example for the adhesive resin to be in a solid form, for example as a film, and correspondingly when arranging, applied between the material and the backing layer on the material, and/or on the top side of the backing layer. It is however particularly preferable for a liquid adhesive resin to be applied to the top side of the material and/or the bottom side of the backing layer. The adhesive resin applied liquid can also be predried after being applied. This can be done for example using heat.

The backing layer (impregnated with synthetic resin and provided with a synthetic resin coating agent on the top side) is pressed with the material for example in a conventional wood composite press. Depending on the design of the material, this can example be configured as a short cycle process, or as a continuous press as well. Pressing occurs for example at the same time as the effect of heat and pressure on the synthetic resin surfaces. In particular with materials that are not formed board-shaped but for example curved, round or the like, alternative pressing devices can also be used.

Alternatively according to a further embodiment of the invention, it is provided that the dried backing layer in order to bond to an adhesive is laminated to a material, wherein in particular a hotmelt, PUR or polyvinyl acetate (PVAC) glue is used. In particular with backing layers with lacquer surfaces, lamination is done, but it can also however be done with synthetic resin surfaces that have already completely cured.

A material is in principle understood to be a material substrate that is bonded to the backing layer; i.e., the material as well as for example the substrate material can be configured as one or more layers of paper glued to each other, for example as a kraft paper. A type of high pressure laminate (HPL) or continuous pressed laminate (CPL) can therefore be produced with the method. According to a further embodiment of the invention, it is however provided that a wood/plastic composite (WPC) or a wood composite, in particular a fiber material, compact-density fiberboard (CDF) material, medium-density fiberboard (MDF) material, high-density fiberboard (HDF) material, chip material or oriented-strand board (OSB) material can be used as the material. Wood-plastic composite (WPC) is also understood to mean corresponding modifications with paper or bamboo as the filler.

The material can in principle have any coated form. The material can accordingly have curved surfaces, for example configured as a round rod. Advantageously, the material can have the shape of a rectangular rod. Given a coating on all sides, this also allows for example stainable frame components for furniture doors with a corresponding synthetic resin surface to be produced.

Particularly preferably, a board-shaped material, in particular a fiber cement board, gypsum fiberboard, WPC board or a wood composite board is used. These can for example be advantageously used for example for wall coverings, ceiling coverings, floor coverings, or as fillers for furniture doors. Particularly in the area of interior design for wall coverings, ceiling coverings or floor coverings or furniture, wood composite boards are used such as for example CDF boards, MDF boards, HDF boards, chipboards or OSB boards. Correspondingly for example a rod-shaped material consisting of corresponding fiber cement material, gypsum fiber material, WPC material or wood composite material such as MDF, HDF, CDF chip or OSB material can be produced.

Moreover, the object is achieved with a material having a color-changeable synthetic resin surface or lacquer surface at least having a backing layer bonded to the material, wherein the backing layer is fully impregnated with an impregnant without a stain additive, an adhesive resin or adhesive arranged between the bottom side of the backing layer and the top side of the material, and an at least largely transparent, open-pore and cured layer of a coating agent with or without a stain additive arranged on the top side of the backing layer. The backing layer preferably comprises a decoration printed on the top side that is visible through the layer consisting of coating agent.

With the material according to the invention having a color-changeable, fully-cured synthetic resin surface or lacquer surface, a synthetic resin surface or lacquer surface resistant to external influences is provided that can be subsequently adapted (stained) in color after full curing. To date, such an adaptation in color has only been known in particular from staining solid wood surfaces. The adaptation in color can in particular be performed by the end consumer.

The subsequent coloring can in particular be done using conventional wood stains, in particular conventional water-based stains, oil-based stains, or solvent-based stains for wood surfaces. In so doing, the basic color of the synthetic resin surface provided by the decoration is then individually modified afterwards, i.e., after the actual industrial production of the synthetic resin surface.

The material according to the invention is significantly more economical and resistant to external influences than stainable solid wood surfaces.

Furthermore, the invention is achieved by a decorative paper having a color-changeable synthetic resin surface or lacquer surface comprising a backing layer configured as for example decorative paper with a bottom side and a top side that is fully impregnated with an impregnant and does not include any stain additive, a layer of a coating agent with or without a stain additive applied to the top side of the backing layer and at least dried that forms an at least largely transparent and open-pore surface upon fully curing. As already described above, particularly with decorative papers, instead of applying a liquid coating agent with or without a stain additive, this can also be used as an impregnant for an overlay that is pressed to the decorative paper. Particularly with synthetic resin surfaces, the layer of coating material can accordingly be formed by an overlay that has been impregnated with a coating agent with or without a stain additive.

One particular embodiment of the intermediate product of decorative paper also provides an additional application of an adhesive resin on the bottom side of the synthetic resin-impregnated backing layer, wherein in particular melamine is arranged as the adhesive resin.

The decorative paper can be generated as an intermediate product from the described production method. In any event, at least one drying process occurs after full impregnation and the application of the coating on the top side, wherein a corresponding drying can also be carried out after full impregnation and after the application. The decorative paper has in particular a synthetic resin surface that is predried and on which a coating agent and stain additive is applied which also contains a synthetic resin.

Finally, the invention is achieved by a finish film having a color-changeable predried lacquer surface comprising a backing layer with a top side and bottom side, wherein the backing layer is fully impregnated with an impregnant that does not comprise a stain additive, and a layer of a coating agent applied to the top side and cured that includes a lacquer with or without a stain additive and forms an open-pore surface. In this case, the impregnation of the backing layer of the finish film can in particular be done using an impregnant based on UF, MUF, phenol resin, acrylate, polyester, alkyd, nitrocellulose, latex, an impregnant mixture or a combined impregnation of impregnants of at least two impregnants based on the above. In this case, in particular an impregnant can be configured based on UF, MUF or phenol resin and as a synthetic resin. A UV lacquer is particularly suitable for a protective layer, or respectively the layer consisting of coating agent with or without a stain additive.

The decorative paper as well as the finish film can be produced as an intermediate product from the described production method. In so doing in any event, at least one drying process occurs after full impregnation and the application of the coating on the top side, wherein a corresponding drying can also be carried out after full impregnation and after the application. The backing layer of the finish film can for example be formed as a plastic film but is however preferably configured as a cellulose web.

The change in color (staining) of the cured synthetic resin surface/lacquer surface following the production of the synthetic resin surface, or respectively the lacquer surface can include the steps: Apply a coloring, in particular a colored stain, to the cured coating, wherein the coloring penetrates the coating agent layer and changes the overall hue of the synthetic resin surface/lacquer surface, possibly remove the excess coloring and/or dry the applied and penetrated coloring, and possibly apply a protective layer, for example another synthetic resin layer or a lacquer layer onto the coating adapted in color.

In addition to incorporating a layer of coating agent with or without a stain additive, various other possibilities exist of configuring a lacquer surface or synthetic resin surface such that they are capable of absorbing stains in a fully cured state and are therefore changeable in color. These measures can in particular be used instead of a coating agent layer with stain additive.

With lacquer layers, in particular lacquer layers based on acrylate, one possibility is to configure at least the outermost lacquer layer to be correspondingly porous by means of the drying process. In so doing, drying is carried out for example over several drying steps, whereby the outer layer can form a porous, open, i.e., not completely closed surface that has a porosity invisible to the naked eye. The stain can penetrate the pores and become fixed.

Another option is to add more of matting agents such as for example sand, glass dust, mineral powder, silicic acid, silicate, polyethylene and/or a copolymer to at least to the outermost layer on the lacquer surface or synthetic resin surface. From adding more of the matting agents, a porosity of the corresponding layer can be also be achieved so that stains (color pigments in solvent) can penetrate and become fixed in the outermost layer in this case.

With synthetic resin surfaces, is also possible to slightly impregnate the decorative paper, or when forming a synthetic resin surface with an overlay to slightly impregnate the overlay. That is, the decorative paper, or respectively the overlay is impregnated with a significantly less amount of synthetic resin in comparison to conventional impregnation, for example only resinated with a synthetic resin coating on the bottom side so that it has an open outer surface after curing and is therefore also porous. A corresponding stain can be added to the arising pores that are also invisible to the naked eye, and dried. A slightly impregnated overlay can for example also be created by strongly resinating a decorative paper arranged below the overlay, i.e., for example provided with excess resin, and the overlay is pressed together with this highly resonated decorative paper. In so doing, the resin penetrates into the overlay at the bottom side from the decorative paper, and the overlay forms a correspondingly open-pore surface that can be stained.

A color-changeable synthetic resin surface can be produced without a stain additive and just with a slightly resinated decorative paper and/or overlay as follows, for example: Provide a decorative paper (for example 65 g/m$^2$), impregnate the decorative paper with an MUF synthetic resin (for example with 50 g/m$^2$) so that the impregnated decorative paper has a weight of approximately 115 g/m$^2$, apply an unimpregnated overlay (for example based on cellulose) with a weight of for example 14 g/m$^2$ to the decorative paper and cure together under the effect of pressure and heat, for example in a press.

An alternative version provides the use of a decorative paper with a weight of approximately 80 g/m$^2$ that is impregnated with 80 g/m$^2$ synthetic resin, for example MUF (end weight of the impregnated decorative paper: 160 g/m$^2$), and that is pressed together with an unresinated decorative paper for example with a weight between 14 g/m$^2$ to 25 g/m$^2$ under the effect of pressure and heat in a press.

If, however, a stain additive is to be used, an overlay that has been impregnated with a coating agent with a stain additive can be pressed for example onto one of the above-described decorative papers alternatively to the previously-described unresinated overlays. The overlay can for example have a weight between 14 g/m$^2$ to 25 g/m$^2$. An MUF/kaolin mixture for example can be used as the coating agent with the stain additive for impregnation, of which approximately 75 g/m$^2$ is added so that the overlay impregnated with a coating agent with a stain additive has a weight of approximately 100 g/m$^2$.

Although some aspects have been described in conjunction with a material, a decorative paper and/or a finish film, it is understood that these aspects also represent a description of the corresponding method so that a block element or a component of the material/decorative paper or the finish film is also to be understood as a corresponding method step, or as a feature of a method step. Analogously, aspects that were described in conjunction with a or as a method step, also represent a description of a corresponding block, or detail, or feature of the material, the decorative paper, and/or the finish film.

BRIEF DESCRIPTION OF THE DRAWINGS

Hereinafter the invention will be further explained with reference to exemplary embodiments. It is shown in.

Example 1 describes another method for producing a color-changeable decorative surface.

DETAILED DESCRIPTION

Figure 1:
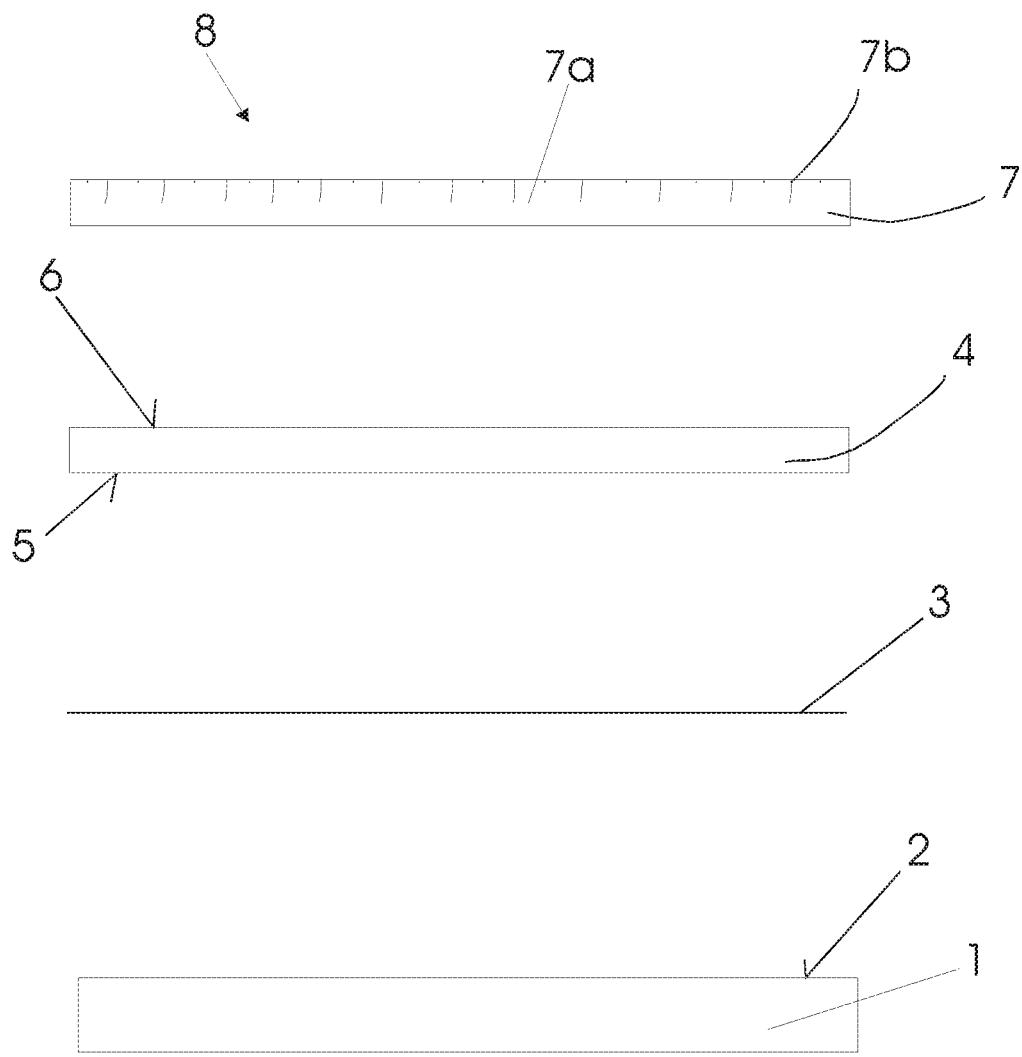
FIG. 1 an inventive material board produced according to the inventive method with a synthetic resin surface in an exploded view.

FIG. 1 shows, in a side perspective, a material 1 with a stainable synthetic resin surface 8 in an exploded view. In contrast to the view, the individual layers (2, 3, 4, 7) in the shown sequence are firmly and unreleasably connected to each other.

The material 1 has a material top side 2. A layer of synthetic resin 3 is arranged on the material top side 2. A backing layer 4 with a bottom side 5 and top side 6 is shown above the synthetic resin 3. The bottom side 5 of the backing layer 4 borders the synthetic resin 3 that adheres the backing layer 4 and the material 1 to each other. A coating 7 is arranged on the top side 6 that comprises the synthetic resin 7a. All of the layers are completely cured.

The coating 7 with the synthetic resin 7a is configured open-pore (not shown here). The open-pore configuration in this case is realized in particular by arranging a filler 7b in the region of the coating 7 that has been applied as a coating 7 as a mixture together with the synthetic resin 7a.

In the exemplary embodiment shown here, the material 1 consists of a material board. The material board is formed from a fiber material, in this case an MDF material. That is, the material board is a wood composite board but could alternatively also be for example formed from WPC material, chip material, HDF material or CDF material.

The backing layer 4 has been fully impregnated with a urea resin (not shown here), or alternatively with a melamine resin. The synthetic resin 3 adhering the backing layer 4 to the material 1 comprises melamine resin in this case. The synthetic resin 3 adheres the top side 2 of the material 1 to the bottom side 5 of the backing layer 4.

Furthermore a decorative print (not shown here) is present on the top side 6 of the backing layer 4. The decorative print in this case shows a colored wood decoration, but however could also be configured as a color decoration or in grayscales. In this case, the decorative print replicates both the structure of the wood as well as the hue of the wood.

The coating 7 applied to the top side 6 comprises a urea resin configured as a synthetic resin 7a with kaolin as a filler 7b. The mixture of kaolin and urea resin was applied liquid to the top side 6. In this case, the weight ratio between the urea resin and kaolin before applying the mixture is 50% by weight:50% by weight, preferably 20% by weight kaolin to 80% by weight liquid resin. After the sandwich has been produced from the individual layers, it was introduced into a cycle press and pressed together under the effect of pressure and heat.

Figure 2:
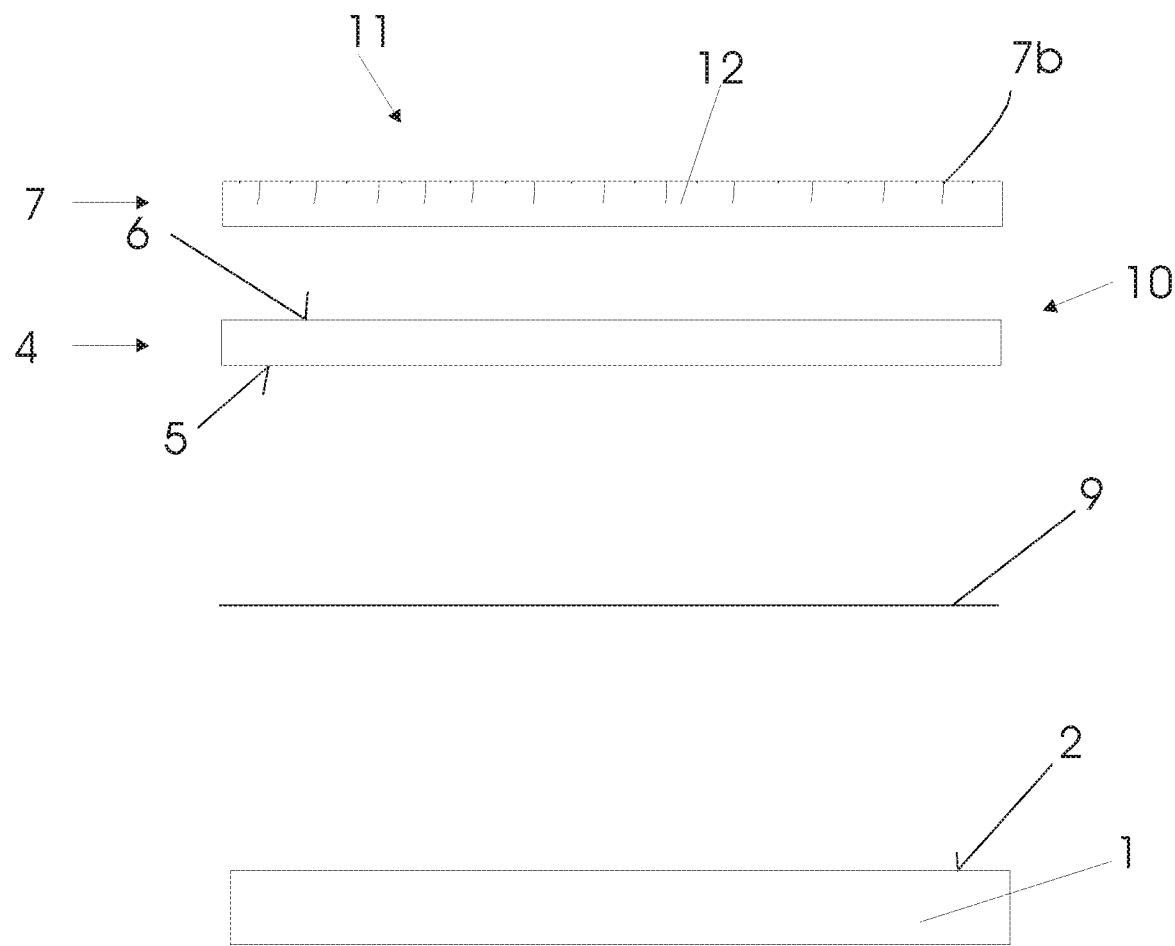
FIG. 2 a material board produced according to the inventive method with a lacquered finish film in an exploded view.

FIG. 2 schematically shows a side exploded view of a color-changeable lacquer surface 11 on a material 1 produced according to the inventive method. The material 1 in this case is also configured as a board but however can also have any other desired shape. The material 1 is a wood composite in this case an MDF board. A backing layer 4 configured here as a finish film 10 is laminated onto the material board 1. To accomplish this, an adhesive 9, in this case a hot melt, has been arranged between the bottom side 5 of the backing layer 4 and the material top side 2 of the material board 1. The material 1 and the coated, cured backing layer 4 (finish film) have been bonded together on a lamination system (not shown here).

The finish film 10 comprises a paper layer (backing layer 4) that is fully impregnated with a liquid acrylate (not shown here), and a decoration (not shown) is printed on its top side 6. Impregnation occurs in an impregnation bath (not shown). The fully impregnated backing layer 4 does not have any stain additive 7b. After impregnation, the backing layer 4 was dried using heat.

Then a layer 7 of a coating agent was applied to the top side 6 of the backing layer 4 using a spray device (not shown here). The coating agent is configured as a lacquer and comprises an acrylate 12 and stain additive 7b, and can alternatively if desired also be configured without a stain additive if the acrylate is to be cured open-pore. After application, the coating agent is also dried using heat, and cured. Due to the stain additives 7b, the surface of the layer 7 is configured open-pore and can absorb the color pigments of a stain.

The layer 7 of coating agent is given kaolin as stain additives. Before applying the coating agent, the ratio was 20% by weight kaolin to 80% by weight acrylate.

Example 1

Another exemplary embodiment for producing a subsequently changeable synthetic resin or lacquer surface provides impregnating a backing layer with a liquid impregnant without a stain additive. In this case, the impregnant consists of melamine resin and/or urea resin. Moreover, additives such as wetting agents, release agents and/or anti-dust agents are added, but no stain additives. Impregnation is carried out with an amount between 80% by weight and 250% by weight relative to the backing layer. In this case, the backing layer is a paper. The paper has a color decoration and is therefore a decorative paper. The end weight of the impregnated backing layer after the impregnation process is approximately 120/m$^2$ to 220 g/m$^2$.

After impregnation, the impregnated backing layer is dried. Drying is done thermally. It can be performed at temperatures between 60° and 200°, but it is done in particular however at temperatures between 40° and 60°. Drying is performed until a residual moisture and/or a residue of volatile contents of 4% to 10% is reached relative to the end weight of the backing layer. Drying is performed in particular in a drying channel in a suspension process.

After the drying procedure, a layer of the coating agent is applied to the backing layer. In so doing, 15-30 g/m$^2$ of the coating agent is applied. Given the very thin application of the coating agent layer (10-90 µm), existing, for example embossed structures in the surface remain.

Application is done in particular by a roller application using a rubber roller. The rubber roller preferably has a Shore A hardness of 40 (Shore A 40). After application, the coating agent layer is also thermally dried. This can also be done in a drying channel. The drying temperatures are preferably between 60° and 180°, and the drying time is between approximately 10 sec. to 20 sec.

After drying, the backing layer can be bonded to a material, in particular a material board, for example a wood composite board such as a fiberboard or chipboard. To accomplish this, the impregnated and coated backing layer is pressed with a material board in a short cycle press. This is done in particular at a pressure between 200 N/cm to 750 N/cm, a temperature between 140° C. and 200° C. at the surface of the backing layer, and over approximately 8 sec. to 40 sec.

The coating agent in this case is a multicoat lacquer based on acrylic resins that can be used as a primer, for example the coating agent Hydro-UV multicoat lacquer HUE 8656X by the company Hesse-Lignal. From the drying passes, the thin application method with the rubber roller and pressing in the short cycle press, both coating lacquers form a ready-to-use stainable surface that has a sufficient porosity so that subsequently applied color particles can accumulate in the outermost surface layer.

The completely cured decorative surface is ready-to-use. To subsequently modify the color of this decorative surface, for example conventional stains based on water or other solvents can be used. For example, the stain "Parquet-Colour" by the company Hesse-Lignal can be used. The stained and dried surface can moreover be subsequently overcoated again with a corresponding protective layer (or fixing layer). For this, a multicoat lacquer based on a two-component PUR acrylic resin lacquer is useful. Accordingly for example, the coating agent PUR SUN-CAPE DE 4800X by the company Hesse-Lignal can be used.

LIST OF REFERENCE NUMBERS

1. Material
2. Material top side
3. Adhesive resin
4. Backing layer
5. Backing layer bottom side
6. Backing layer top side
7. Layer of coating agent
7a Synthetic resin
7b Stain additive
8. Synthetic resin surface
9. Adhesive
10. Finish film
11. Lacquer surface
12. Acrylate

The invention claimed is:

1. A method for producing a color-changeable synthetic resin surface or lacquer surface, comprising the steps:
provide a backing layer having a bottom side and a top side,
fully impregnate the backing layer with a liquid impregnant without a stain additive,
at least slightly dry the impregnated backing layer without fully curing,
apply at least one layer of a coating agent to the top side of the backing layer, said at least one layer of the coating agent comprising an overlay at least partly impregnated with synthetic resin as an impregnant,
dry the at least one layer of the coating agent without fully curing,
bond the backing layer directly to a material by pressing the at least slightly dried backing layer and the dried coating agent comprising the overlay,
wherein during the pressing, the at least one layer of the coating agent cures to an open-pore, at least largely transparent layer.

2. The method according to claim 1, wherein the coating agent comprises the synthetic resin or a lacquer based on an aminoplast selected from the group consisting of a urea resin, acrylate, polyurethane, phenol resin, polyester, alkyd, nitrocellulose, latex and mixtures thereof as the impregnant.

3. The method according to claim 1, wherein the synthetic resin is based on an aminoplast selected from the group consisting of a urea resin, a melamine formaldehyde resin, acrylate, polyurethane, phenol resin and mixtures thereof.

4. The method according to claim 1, wherein before bonding, at least one layer of an adhesive resin is applied to the bottom side of the backing layer which adheres the backing layer to the material for bonding under the effect of pressure and heat.

5. The method according to claim 1, wherein the material is formed as a material board.

6. The method according to claim 5, wherein the material board is a fiber cement board, gypsum fiber board, wood plastic composite board, a wood composite board, a fiber material, compact-density fiberboard material, medium-density fiberboard material, high-density fiberboard material, chip material and oriented-strand board material.

7. The method according to claim 1, wherein the overlay impregnate step is conducted using the liquid impregnant which contains no stain additive.

8. The method according to claim 1, wherein the impregnated backing layer including both surfaces of the impregnated backing layer is impregnated with the liquid and no stain additive.

9. The method according to claim 2, wherein the urea resin is selected from the group consisting of urea-formaldehyde resin, melamine-urea-formaldehyde resin and combinations thereof.

* * * * *